H. E. TRENT.
DASH POT.
APPLICATION FILED MAR. 23, 1914.

1,202,922. Patented Oct. 31, 1916.

WITNESSES:
Fred A. Lind.
J. H. Procter.

INVENTOR
Harold E. Trent
BY
Wesley G. Carr
ATTORNEY

UNITED STATES PATENT OFFICE.

HAROLD E. TRENT, OF WILKINSBURG, PENNSYLVANIA, ASSIGNOR TO WESTINGHOUSE ELECTRIC AND MANUFACTURING COMPANY, A CORPORATION OF PENNSYLVANIA.

DASH-POT.

1,202,922.  Specification of Letters Patent.  Patented Oct. 31, 1916.

Application filed March 23, 1914. Serial No. 826,516.

*To all whom it may concern:*

Be it known that I, HAROLD E. TRENT, a subject of the King of Great Britain, and a resident of Wilkinsburg, in the county of Allegheny and State of Pennsylvania, have invented a new and useful Improvement in Dash-Pots, of which the following is a specification.

My invention relates to time-element devices and particularly to dash pots.

The object of my invention is to provide a dash pot of the sucker type which will retard the operation of a device to which it is connected during a period of time which varies substantially inversely as the force tending to operate the same.

Heretofore, sucker dash pots have been constructed which comprise substantially flat coöperating members. Dash pots of this type require considerable time to reset and are not accurate in their time setting by reason of the formation of bubbles and the accumulation of foreign particles, and the coöperating members are frequently out of alinement.

In my present invention, I provide a dash pot having conical coöperating members so arranged that the relative positions of the members will not vary to cause them to be out of alinement.

Figure 1:
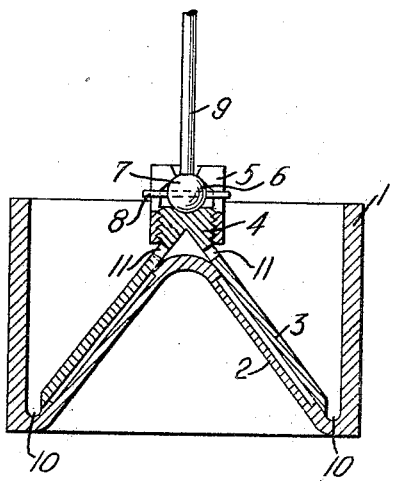
Figure 3:
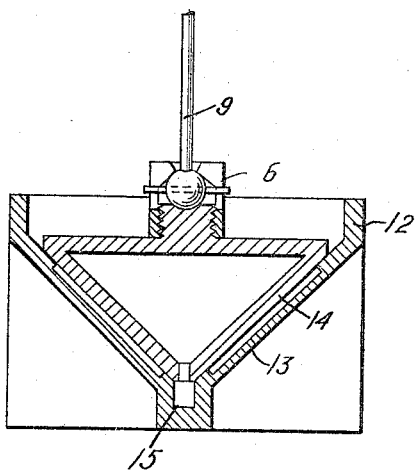
Figure 2:
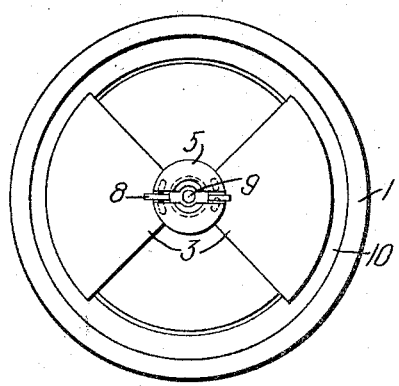
Figure 4:
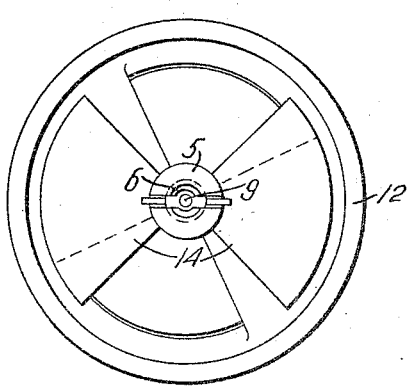

In the accompanying drawings, Figure 1 is a view, partially in section and partially in elevation, of a dash pot embodying my invention. Fig. 2 is a top plan view of the dash pot shown in Fig. 1. Fig. 3 is a view, partially in section and partially in elevation, of a modified form of dash pot embodying my invention, and Fig. 4 is a plan view of the dash pot shown in Fig. 3.

Referring particularly to Figs. 1 and 2 of the drawings, a receptacle 1, having its bottom formed into a cone 2, coöperates with a piston 3 of conical shape to form a dash pot. The piston 3 has two sections cut therefrom, substantially as shown in Fig. 2 and for purposes hereinafter set forth. The upper portion of the piston 3 is formed into a cylindrical member 4 which is screw threaded to receive the portion 5 of a ball and socket joint 6, which comprises, besides the members 4 and 5, a ball 7 and a pin 8. The members 4 and 5 are arranged to receive the ball 7 which is attached to a rod 9 for operating the device. The member 5 is slotted to allow of the free movement of the rod 9 in any plane. However, the pin 8 is inserted in the ball 7 to prevent rotative movement thereof with respect to the piston 3.

An annular groove 10 is provided in the lower part of the receptacle 1 and the piston 3 is provided with a plurality of holes 11, for reasons hereinafter set forth. The conical bottom 2 may have its surface countersunk to correspond to the shape of the piston 3. However, this is not necessary if a variable time element is not desired.

The rod 9 is operatively connected to a circuit breaker (not shown) or other devices the operation of which is to be retarded, and the receptacle 1 is partially filled with some fluid, such as oil or glycerin. Since the piston 3 is normally in engagement with the conical bottom 2, and since there is a suction action between the two surfaces that are in contact, it will require application of a maintained force upon the rod 9 in an upward direction to separate members 2 and 3, as will be readily understood. By rotating the piston 3 with respect to the conical bottom 2 an increased or a decreased area of coöperating surface may be obtained. Thus, any desirable time element may be attained by rotating either the piston rod 9 or the receptacle 1 until the desired coöperating areas are in engagement.

If air bubbles or foreign particles collect on the upper surface of the conical member 2, they will be forced downwardly by the cleaning or wiping action of the conical members into the annular groove 10 or upward through the openings 11 in the piston 3. The time of resetting the device, after it has operated, is relatively short, since the floating action of the piston is relatively small, as compared with that of a dash pot having a flat piston.

Referring now particularly to Figs. 3 and 4 of the drawings, a receptacle 12 is provided with a bottom 13 having substantially the shape of an inverted cone. A piston 14, also of inverted cone shape, is provided to coöperate with the conical bottom 13 and is operatively connected to a piston rod 9, through a ball and socket joint 6, substantially as hereinbefore explained with respect to Figs. 1 and 2 of the drawings. At the apex of the conical bottom 13 is a well 15 for the reception of any foreign particles that may collect on the surfaces of the conical members 13 and 14 and be forced downwardly by the cleaning or wiping action of the same. The conical bottom 13 may be also counter-sunk over a portion of its surface, and the piston 14 may be shaped to cover these counter-sunk portions, depending upon the time element desired.

By rotating either the piston rod 9 or the receptacle 12 the time element may be changed, substantially as was hereinbefore explained with respect to Figs. 1 and 2. To obtain a longer invariable time action, both the piston and the conical bottom may form complete cones to provide greater surface suction.

While I have shown my invention in its preferred forms, it is not so limited but is capable of various modifications within the scope of the appended claims.

I claim as my invention:

1. A time-element device comprising a receptacle and a conical piston so shaped that it has a wiping action with respect to the receptacle when moved longitudinally with respect thereto, said receptacle and piston being so cut away that, when they are rotated relatively to each other, the area of contact surface is varied.

2. A dash pot comprising a conical receptacle having part of the surface thereof cut away and a coöperating conical shaped piston having part thereof cut away, said piston and receptacle being adapted to vary the area of engaging surface when they are relatively rotated.

3. A dash pot comprising two coöperating conical shaped members having their engaging faces so shaped that the time required to separate them may be varied by relative rotative movement thereof.

4. A dash pot comprising two coöperating conical shaped members having parts thereof so cut away that, when they are rotated with respect to each other, the pull required to separate the members is varied, said members being conical in shape to provide a wiping action for cleaning the engaging surfaces thereof.

5. A dash pot comprising two coöperating conical shaped members having parts of the engaging surfaces so cut away that a variable time may be required to separate the members if they are rotated relatively to each other before the separation.

6. In a time-element device, the combination with a receptacle having a conical shaped bottom, of a conical shaped piston therefor having diametral sections thereof removed, the conical shaped bottom being so countersunk over a portion of its surface that the area of contact between the receptacle and the piston may be varied to thereby obtain different adhesive action between the receptacle and the piston.

7. A time-element device comprising a receptacle having a conical shaped bottom with parts of the surface thereof cut away, a conical shaped piston therefor having openings in the surface thereof, a piston rod, a ball-and-socket joint for connecting the piston rod to the piston, and a pin so inserted in the said ball-and-socket joint that the piston may be rotated relatively to the receptacle to obtain a variable time element, due to the varying areas in engagement.

8. A dash pot comprising a conical receptacle, a conical piston therefor, said piston and receptacle being adapted to coöperate with each other to secure a suction therebetween and a recess in the receptacle to collect foreign particles that are wiped from the engaging surfaces when the receptacle and piston are engaged.

9. A dash pot comprising two coöperating conical shaped members having their engaging faces so shaped that the time required to separate them may be varied by relative rotative movement thereof, said members being adapted to have a wiping action when adjusted for any time setting.

In testimony whereof, I have hereunto subscribed my name this 19th day of Mar. 1914.

HAROLD E. TRENT.

Witnesses:
JNO. MCKECHNIE,
B. B. HINES.

Copies of this patent may be obtained for five cents each, by addressing the "Commissioner of Patents, Washington, D. C."